United States Patent [19]

Chicklis et al.

[11] 4,136,316
[45] Jan. 23, 1979

[54] MULTI-COLOR, ACTIVATOR-ACTIVATOR LASER

[75] Inventors: Evan P. Chicklis, Nashua, N.H.; Charles S. Naiman, Brookline, Mass.

[73] Assignee: Sanders Associates, Inc., Nashua, N.H.

[21] Appl. No.: 760,486

[22] Filed: Jan. 19, 1977

[51] Int. Cl.² .............................................. H01S 3/16
[52] U.S. Cl. ........................ 331/94.5 F; 252/301.4 H
[58] Field of Search ...................... 331/94.5 E, 94.5 F, 331/94.5 C, 94.5 D, 94.5 P; 252/301.4

[56] References Cited

U.S. PATENT DOCUMENTS

| 3,753,148 | 8/1973 | Billman | 331/94.5 C |
| 3,833,805 | 9/1974 | Naiman et al. | 331/94.5 F |

OTHER PUBLICATIONS

Caird et al., Analysis of Laser Emission in $HO^{3+}$-Doped Materials, IEEE J. Quant Elect., vol. QE-11 No. 3 (Mar. 1975), pp. 97-99.
Remski et al., Pulsed Laser Action in $LiYF_4:Er^{3+}$, $HO^{3+}$ at 77° K., IEEE J. Quant Elect., vol. QE-5, No. 4, (Apr. 1969), p. 214.
Chicklis et al., High-Efficiency Room-Temperature 2.06-μm Laser Using Sensitized $HO^{3+}$:YLF, App. Phys. Let., vol. 19, No. 4 (Aug. 15, 1971), pp. 119-121.
Gandy et al., Simultaneous Laser Action of Neodymium and Ytterbium Ions in Silicate Glass, Proc. IRE, vol. 50, No. 10, (Oct. 1962), pp. 2114-2115.

Primary Examiner—William L. Sikes
Attorney, Agent, or Firm—Louis Etlinger; Richard I. Seligman

[57] ABSTRACT

Wavelength diversity in solid state lasers is achieved by providing a single laser rod comprising a host material and two different active ion species wherein each of the active ions also sensitizes the other active ion.

The invention herein described was made in the course of or under a contract or subcontract thereunder with the Department of the Air Force.

13 Claims, 3 Drawing Figures

MULTI-COLOR, ACTIVATOR-ACTIVATOR LASER

BACKGROUND OF THE INVENTION

This invention relates to lasers and, more particularly, to lasers which emit at more than one wavelength.

There are many applications requiring high efficiency, wavelength diverse lasers particularly relating to tactical military scenarios. Presently, the availability of such lasers is at a minimum. One approach has been to use second harmonic generation. For example, lasers employing $Nd^{+3}$ as the active ion lase at 1.06 microns. Some degree of an added frequency option lies in the use of the 1.06 micron laser "doubled" to 0.53 microns through second harmonic generation. This approach suffers from (1) the material limitations on all the optical components involved, since nonlinear conversion requires high peak powers, and (2) the basic inefficiency of the doubling process.

Another approach has been to employ two cavities having a common optical leg, each of which is tuned to a different transition of the laser medium employing a single active ion such that when the laser emits two different wavelengths each cavity will generate laser pulses at the respective wavelengths. This technique requires great care in the critical selection of the laser medium which must generate substantial amount of energies at distinct wavelengths.

SUMMARY OF THE INVENTION

Accordingly, it is an object of this invention to provide an improved laser.

It is another object of this invention to provide an improved laser which emits at multiple distinct wavelengths.

Briefly, the present invention provides an optically pumped solid state laser which emits radiation at multiple wavelengths by providing a laser rod incorporating multiple active ions. In one embodiment a laser is disclosed comprising a rod having a lithium yttrium fluoride ($LiYF_4$) host which is co-doped with ions of erbium ($Er^{3+}$) and holmium ($Ho^{3+}$) wherein each of the ions is an active ion and further wherein each acts as a sensitizing ion for the other.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
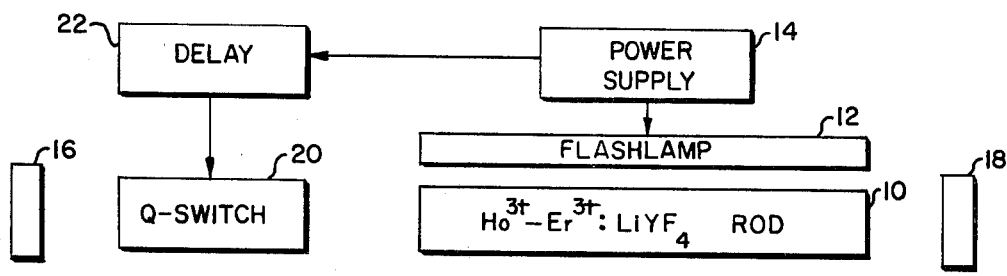
FIG. 1 is a block diagram of one embodiment of the invention.

Referring now to FIG. 1 of the drawings, there is illustrated thereby a first embodiment of the invention. The laser of FIG. 1 comprises a laser medium 10 preferably including a $LiYF_4$ host which is co-doped with $Ho^{3+}$ and $Er^{3+}$. Both the $Ho^{3+}$ and $Er^{3+}$ are used in the $LiYF_4$ host as active ions. The $Ho^{3+}$ ions are made to lase at 0.75 microns and the $Er^{3+}$ ions at 0.85 microns. Rod 10 is pumped by a flashlamp 12 driven by a power supply 14 and is incorporated in a resonant cavity defined by a pair of mirrors 16 and 18. The mirrors are selected to reflect energy at both operating wavelengths of the laser. As conventionally configured, one mirror is 100% reflecting while the other is partially reflecting so as to provide an output for the laser.

Also disposed within the cavity defined by the mirrors 16 and 18 is a Q-switch 20 driven from power supply 14 via delay circuitry 22. However, the means for providing energy to the pumping means and for controlling the Q-switch form no part of the invention as these are well known and many different circuits may be employed.

Figure 2:
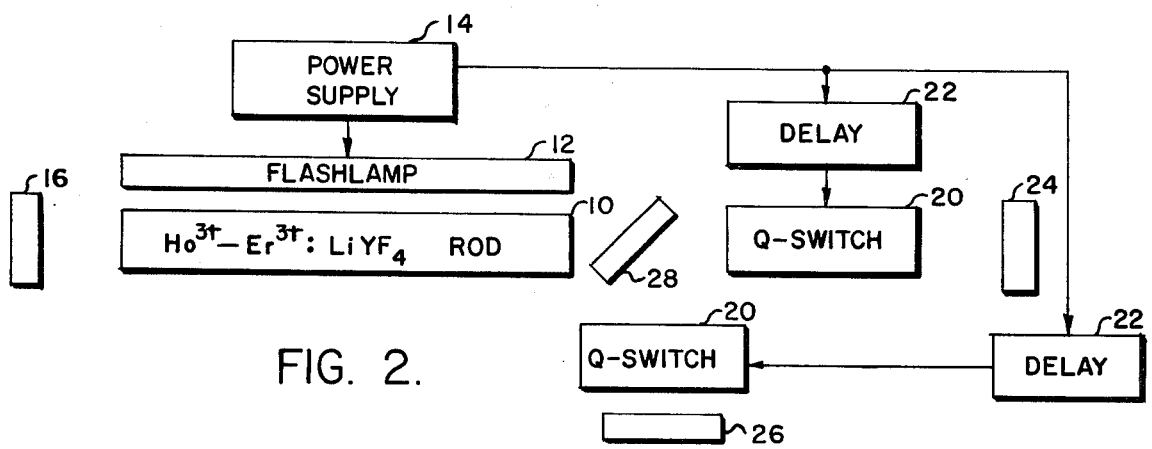
FIG. 2 is a block diagram of a second embodiment of the invention.

A second embodiment of the invention is illustrated in FIG. 2 of the drawings. In this embodiment of the invention two resonating cavities are formed. One of the cavities is bounded by the mirror 16 and a mirror 24 while the second cavity is bounded by the mirror 16 and a mirror 26. The common leg of these two cavities includes a rod 10 containing multiple active ions and a beam splitter 28. Beam splitter 28 is situated at an angle of 45° with respect to the cavities and is configured to transmit and reflect light at the two different wavelengths, respectively. The mirror 16 is configured to be reflecting at both the wavelengths of interest while the mirrors 24 and 26 are each configured to be reflecting at only one of the wavelengths of interest. Each of the noncommon sections of the cavities contain a Q-switch 20 which is operated from the power supply 14 via delays 22.

Both of the embodiments described above make use of the energy transfer in an activator-activator system. Prior to the present invention energy transfer has been used for improving laser performance in many materials. Generally, the phenomenon of sensitization is employed to improve the pumping efficiency of material by absorbing the excitation energy in one species (the sensitizer) and transferring the excitation to the active ion (the activator) such systems are called sensitizing-activator systems.

In the present application in which wavelengths diversity is achieved multiple ions are employed as the active species and utilizing the pump bands of the different ions there is a gain in both efficiency and wavelength diversity. Such a system of more than one ion with "reversible" transfer between some metastable levels of the two (or more) ion can be defined as an "activator-activator system". In the present example energy transfer is accomplished between two levels of different ions which are nearly resonant in energy. The transfer may be sufficiently fast so that the levels are considered to be in thermal equilibrium. Equivalently, the interaction (or transfer) rate between the ions is much faster than the spontaneous emission rates. As a result many of the features of the system cannot be distinguished since the ions "lose their identity" and exhibit features (spectral emission and lifetime) of a new ion consisting of both the levels of the individual ions with a different lifetime. Only in a time frame short compared to the interaction time is it possible to isolate the ions.

Figure 3:
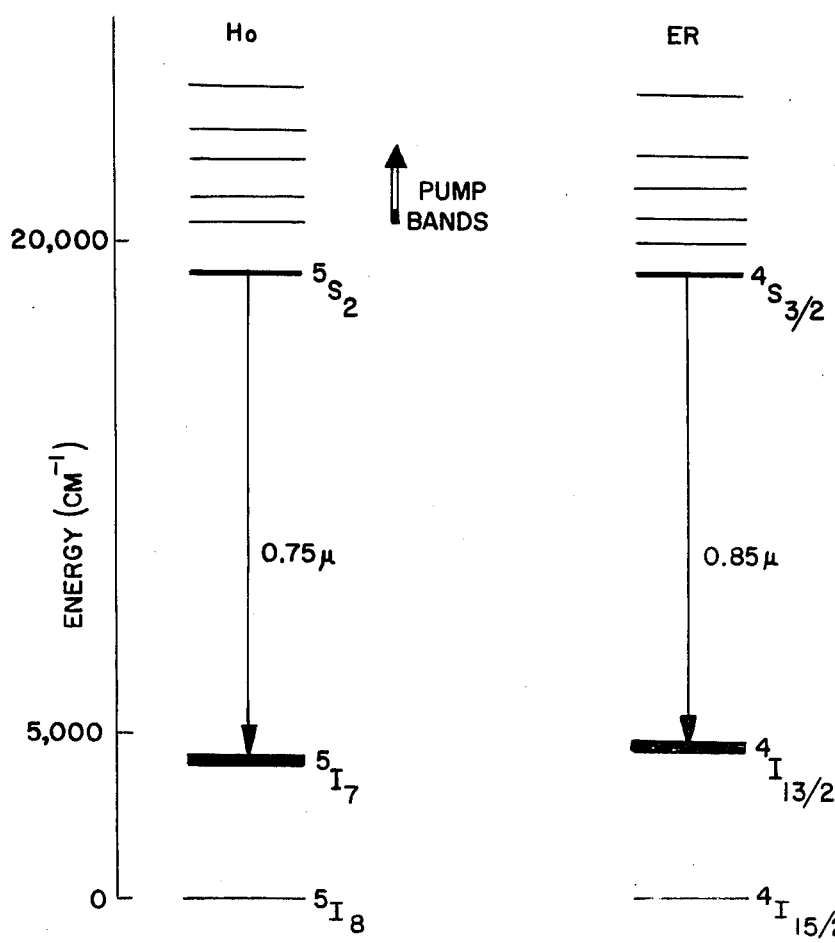
FIG. 3 is a diagram of the energy level structure of a Er-Ho:$LiYF_4$ laser.

The $^4S_{3/2}$ and $^5S_2$ levels of $Er^{3+}$ and $Ho^{3+}$ are a specific example of such a system where the transfer rate between these levels is much faster than the decay rates from these levels. One very significant point is that while these levels are resonant in energy (measured from the ground state), emission from these levels is easily resolved to the lower lying, widely separated intermediate levels. So the S state to first excited state transition is for the separate ions: (1) Ho: $^5S_2$ to $^5I_7$ producing at a wavelength of 0.75 microns, (2) Er: $^4S_{3/2}$ to $^4I_{13/2}$ producing at a wavelength of 0.85 microns. Because of the resonant transfer between the S states, however, both transitions exhibit the same fluorescence lifetime. This is illustrated in FIG. 3.

Furthermore, the absorption spectra of the ions above the S levels are quite different. The composite absorptions spectrum has fewer gaps and the resulting pumping efficiency will be considerably improved over the respective single composite systems. Thus, the S levels of the Er-Ho:LiYF$_4$ constitutes an activator-activator system.

In the embodiment disclosed employing an Er-Ho:LiYF$_4$ rod the distinction between activator and sensitizer is ambiguous. For the 0.85 micron ($^4S_{3/2}$ - $^4I_{13/2}$) laser transition, Er is the activator and Ho is the sensitizer; for the 0.75 micron ($^5S_2$ - $^5I_7$) laser transition, Ho is the activator and Er is the sensitizer. In addition, both laser transitions can be made to occur simultaneously. In this sense, this system may be referred to as an activator-activator system.

Although specific materials and laser transitions have been discussed other materials and transitions may be employed in accordance with the teachings of the invention. Thus, it is to be understood that the embodiments shown are illustrative only, and that many variations and modifications may be made without departing from the principles of the invention herein disclosed and defined by the appended claims.

We claim:

1. A laser, comprising:
   a laser rod aligned within a resonant cavity;
   said rod comprising a host material of lithium yttrium fluoride and at least two different active laser ions; and
   means for pumping said laser rod.

2. A laser as defined in claim 1, wherein one of said active laser ions is erbium.

3. A laser as defined in claim 2 wherein another of said active laser ions is holmium.

4. A laser as defined in claim 1, wherein said pumping means includes a flashlamp optically coupled to said laser rod, and means for supplying electrical power to said flashlamp.

5. A laser as defined in claim 1 further including a Q-switch disposed within said resonant cavity.

6. A laser, comprising:
   a plurality of laser cavities, each having a common section;
   a laser rod disposed in the common section of said cavities, said rod comprising a host material and at least two different active laser ions;
   means for pumping said laser rod; and
   a beam splitter disposed at the junction of said common and noncommon sections of said cavities.

7. A laser as defined in claim 6, wherein said host material is lithium yttrium fluoride.

8. A laser as defined in claim 7, wherein one of said active laser ions is erbium.

9. A laser as defined in claim 8, wherein another of said active laser ions is holmium.

10. A laser as defined in claim 6 further including a plurality of Q-switches disposed in the noncommon sections of said cavities, and means for actuating said Q-switches.

11. A laser as defined in claim 6, wherein at least one of said active laser ions is a sensitizer for at least another of said active laser ions.

12. A laser, comprising:
    A laser rod aligned within a resonant cavity;
    said rod comprising a host material and at least two different active laser ions, each of said two active laser ions being a sensitizer for the other of said two active laser ions; and
    means for pumping said laser rod.

13. A laser as defined in claim 12, wherein the upper levels of said two active laser ions are nearly resonant in energy.

* * * * *